(12) United States Patent
Lee et al.

(10) Patent No.: US 10,330,565 B2
(45) Date of Patent: Jun. 25, 2019

(54) TEST APPARATUS INCLUDING A FIXING JIG FOR VIBRATION TEST OF BATTERY PACK

(71) Applicant: LG Chem, Ltd., Seoul (KR)

(72) Inventors: Hee-Su Lee, Daejeon (KR); Soon-Chang Hong, Daejeon (KR); Bo-Hyon Kim, Daejeon (KR); Jae-Hyun Seo, Daejeon (KR); Hyung-Jun Ahn, Daejeon (KR); Hyeon-Ki Yun, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 15/989,385

(22) Filed: May 25, 2018

(65) Prior Publication Data

US 2018/0366788 A1 Dec. 20, 2018

(30) Foreign Application Priority Data

Jun. 20, 2017 (KR) ........................ 10-2017-0078062

(51) Int. Cl.
| | |
|---|---|
| *H01M 2/10* | (2006.01) |
| *G01M 7/02* | (2006.01) |
| *H01M 10/42* | (2006.01) |
| *H01M 10/48* | (2006.01) |
| *B60L 50/64* | (2019.01) |

(52) U.S. Cl.
CPC ............ *G01M 7/027* (2013.01); *B60L 50/64* (2019.02); *G01M 7/025* (2013.01); *H01M 2/1016* (2013.01); *H01M 10/4285* (2013.01); *H01M 10/482* (2013.01); *H01M 2220/20* (2013.01)

(58) Field of Classification Search
CPC .. G01M 7/027; G01M 7/025; H01M 10/4285; H01M 10/482
USPC .................................................... 73/662, 663
See application file for complete search history.

(56) References Cited

U.S. PATENT DOCUMENTS

| | | | |
|---|---|---|---|
| 7,013,731 B1 * | 3/2006 | Szeremeta ............. | G01M 7/02 73/593 |
| 2009/0056458 A1 * | 3/2009 | Ma ......................... | G01M 7/06 73/663 |
| 2010/0131236 A1 * | 5/2010 | Lafleur .................... | G01N 3/20 702/158 |
| 2011/0192230 A1 * | 8/2011 | Nam ...................... | G01M 7/027 73/577 |
| 2012/0103100 A1 * | 5/2012 | Sueki ...................... | G01B 5/06 73/662 |
| 2014/0087234 A1 | 3/2014 | Lent et al. | |

(Continued)

FOREIGN PATENT DOCUMENTS

| | | |
|---|---|---|
| CN | 107515090 A * | 12/2017 |
| KR | 10-2009-0061725 A | 6/2009 |

(Continued)

*Primary Examiner* — Lisa M Caputo
*Assistant Examiner* — Rose M Miller
(74) *Attorney, Agent, or Firm* — Morgan, Lewis & Bockius LLP (57) ABSTRACT

Provided is a test apparatus including a fixing jig for vibration test of a battery pack. The fixing jig includes at least one upper block that is coupled to at least one coupler formed in the battery pack, a lower block placed below the at least one upper block, and a base plate having a board shaped and placed below the lower block.

8 Claims, 8 Drawing Sheets

(56) References Cited

U.S. PATENT DOCUMENTS

| | | | | |
|---|---|---|---|---|
| 2014/0202252 A1* | 7/2014 | Umehara | ............. | G01M 7/027 |
| | | | | 73/664 |
| 2015/0007662 A1* | 1/2015 | Murphy | ............... | G01M 7/027 |
| | | | | 73/663 |
| 2015/0185108 A1* | 7/2015 | Baek | .................... | G01M 7/027 |
| | | | | 73/669 |

FOREIGN PATENT DOCUMENTS

| KR | 10-2015-0073953 A | | 7/2015 | | |
|---|---|---|---|---|---|
| KR | 10-2016-0072572 A | | 6/2016 | | |
| KR | 101637175 B1 | * | 7/2016 | ............ | G01M 7/027 |
| KR | 20170019224 A | * | 2/2017 | ............. | G01R 31/36 |

* cited by examiner

TEST APPARATUS INCLUDING A FIXING JIG FOR VIBRATION TEST OF BATTERY PACK

TECHNICAL FIELD

The present application claims priority to Korean Patent Application No. 10-2017-0078062 filed in the Republic of Korea on Jun. 20, 2017, the disclosures of which are incorporated herein by reference.

The present disclosure relates to a test apparatus including a fixing jig for vibration test of a battery pack, and more particularly, to a test apparatus including a fixing jig that provides a structure corresponding to a state in which a battery pack is mounted in a battery room of an electric vehicle, to use in verifying if the battery pack is designed to withstand vibration that is transmitted to the battery room by the movement of the electric vehicle.

BACKGROUND

Recently, there is dramatically growing demand for portable electronic products such as laptop computers, video cameras and mobile phones, and with the extensive development of electric vehicles, accumulators for energy storage, robots and satellites, many studies are being made on high performance secondary batteries that can be recharged repeatedly.

Currently, commercially available secondary batteries include nickel-cadmium batteries, nickel-hydrogen batteries, nickel-zinc batteries, lithium secondary batteries and the like, and among them, lithium secondary batteries are gaining attention due to advantages of charging and discharging freely in the absence of a memory effect, a very low self-discharge rate, and high energy density as compared to nickel-based secondary batteries.

Meanwhile in general, a battery pack includes a plurality of battery modules, each including at least one battery cell, and each battery module is connected in series and/or in parallel within a space provided from the case of the battery pack.

Particularly, to increase the travel distance of elective vehicles such as hybrid electric vehicles, it is inevitable to increase the capacity of the battery pack mounted therein, and as a consequence, the weight of the battery pack amounts to a few hundreds of kilograms.

To minimize the spatial limitation resulting from the seating space of the electric vehicle, the battery pack is often designed such that the battery pack is placed in the battery room provided below the electric vehicle (e.g., below the seats).

Specifically, the case of the battery pack has a plurality of couplers, and each coupler may be fastened through a bolt provided on the side of the lower space of the electric vehicle.

Particularly, when the battery pack is designed such that the battery pack is fixed with a hanging structure on the sides of the battery room provided in the electric vehicle, vibration generated due to the movement of the electric vehicle is transmitted to the plurality of couplers provided in the battery pack through the battery room.

However, conventionally, when performing a vibration test on the battery pack, accuracy in the vibration test results cannot be guaranteed, because the special fixing structure of the battery pack and the electric vehicle described above is not taken into account.

SUMMARY

The present disclosure is designed to solve the above-described problem, and therefore the present disclosure is directed to providing a test apparatus including a fixing jig that provides a structure corresponding to a state in which a battery pack is to be mounted in a battery room of an electric vehicle.

These and other objects and advantages of the present disclosure will be understood by the following description and will be apparent from the embodiments of the present disclosure. Additionally, it will be readily understood that the objects and advantages of the present disclosure are realized by the means set forth in the appended claims and combinations thereof.

Various embodiments of the present disclosure to achieve the above-described object are as below.

A test apparatus according to an aspect of the present disclosure includes a fixing jig for vibration test of a battery pack. The fixing jig includes at least one upper block that is coupled to at least one coupler formed in the battery pack, a lower block placed below the at least one upper block, and a base plate having a board shaped and placed below the lower block. A lower surface of the lower block has an entire flat shape to allow surface contact with an upper surface of the base plate. A plurality of main convex parts that protrudes higher than a second area of an upper part of the lower block is formed in a first area of an upper part of the lower block. The plurality of main convex parts provides a step structure to support bottom of two ends of each upper block.

Preferably, each upper block may have at least one guide groove corresponding to a shape of an upper part of each coupler.

In this case, each upper block may be fixed to each coupler through a bolt inserted in vertical direction in a state that each upper block is in contact with the upper part of each coupler through each guide groove.

Preferably, the lower block may have a plurality of stoppers to support one side surface of each end of each upper block through surface contact.

In this case, each stopper may be fixed to each upper block through a bolt inserted in horizontal direction in a state that each stopper is in surface contact with the side surface of one end of each upper block.

Optionally, at least one subconvex part that protrudes higher than the second area may be formed in a third area of an upper part of the lower block. In this case, a central part between the two ends of the at least one upper block may be supported up by each subconvex part.

Additionally, the test apparatus may further include a vibration generator coupled to part of the base plate to generate vibration in a preset pattern.

In this case, the base plate may be fixed to the vibration generator through a bolt inserted in vertical direction in a state that the base plate is in surface contact with an upper surface of the vibration generator.

According to at least one of the embodiments of the present disclosure, a vibration test may be performed on the battery pack while the battery pack is provided with a structure corresponding to a state that the battery pack is to be mounted in the battery room of the electric vehicle. Accordingly, vibration having a pattern that is likely to be generated as the electric vehicle travels is applied to the battery pack through the fixing jig, thereby accurately verifying if the battery pack is designed to withstand vibration that is applied to the battery room of the electric vehicle.

The effects of the present disclosure are not limited to the above-mentioned effects, and other effects not mentioned herein will be clearly understood by those skilled in the art from the disclosure of the appended claims.

BRIEF DESCRIPTION OF THE DRAWINGS

The accompanying drawings illustrate a preferred embodiment of the present disclosure and together with the following detailed description of the present disclosure, serve to provide further understanding of the technical aspects of the present disclosure, and thus, the present disclosure is not construed as being limited to the drawings.

DETAILED DESCRIPTION

Hereinafter, preferred embodiments of the present disclosure will be described in detail with reference to the accompanying drawings. Prior to the description, it should be understood that the terms or words used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the embodiments described herein and illustrations shown in the drawings are just a most preferred embodiment of the present disclosure, but not intended to fully describe the technical aspects of the present disclosure, so it should be understood that a variety of other equivalents and modifications could be made thereto at the time of filing the application.

Additionally, in describing the present disclosure, when it is deemed that a detailed description of relevant known elements or functions renders the key subject matter of the present disclosure ambiguous, the detailed description is omitted herein.

The terms including the ordinal number such as "first", "second" and the like, may be used to distinguish one element from another among various elements, but not intended to limit the elements by the terms.

Unless the context clearly indicates otherwise, it will be understood that the term "comprises" or "includes" when used in this specification, specifies the presence of stated elements, but does not preclude the presence or addition of one or more other elements. Additionally, the term <control unit> as used herein refers to a processing unit of a function or operation, and this may be implemented by hardware or software alone or in combination.

In addition, throughout the specification, it will be further understood that when an element is referred to as being "connected to" another element, it can be directly connected to the other element or intervening elements may be present.

Figure 1:
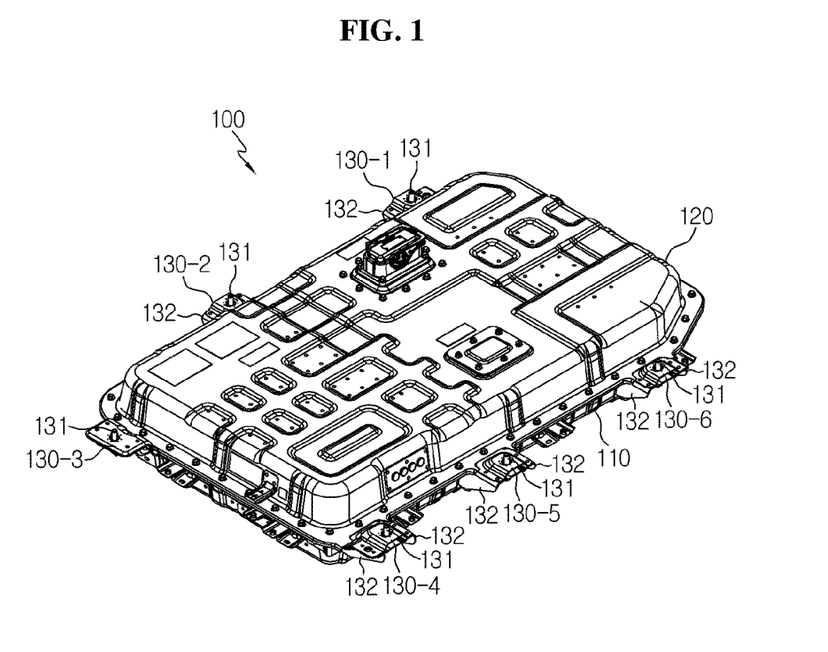
FIG. 1 is an assembled perspective view of a battery pack according to an embodiment of the present disclosure.
Figure 2:
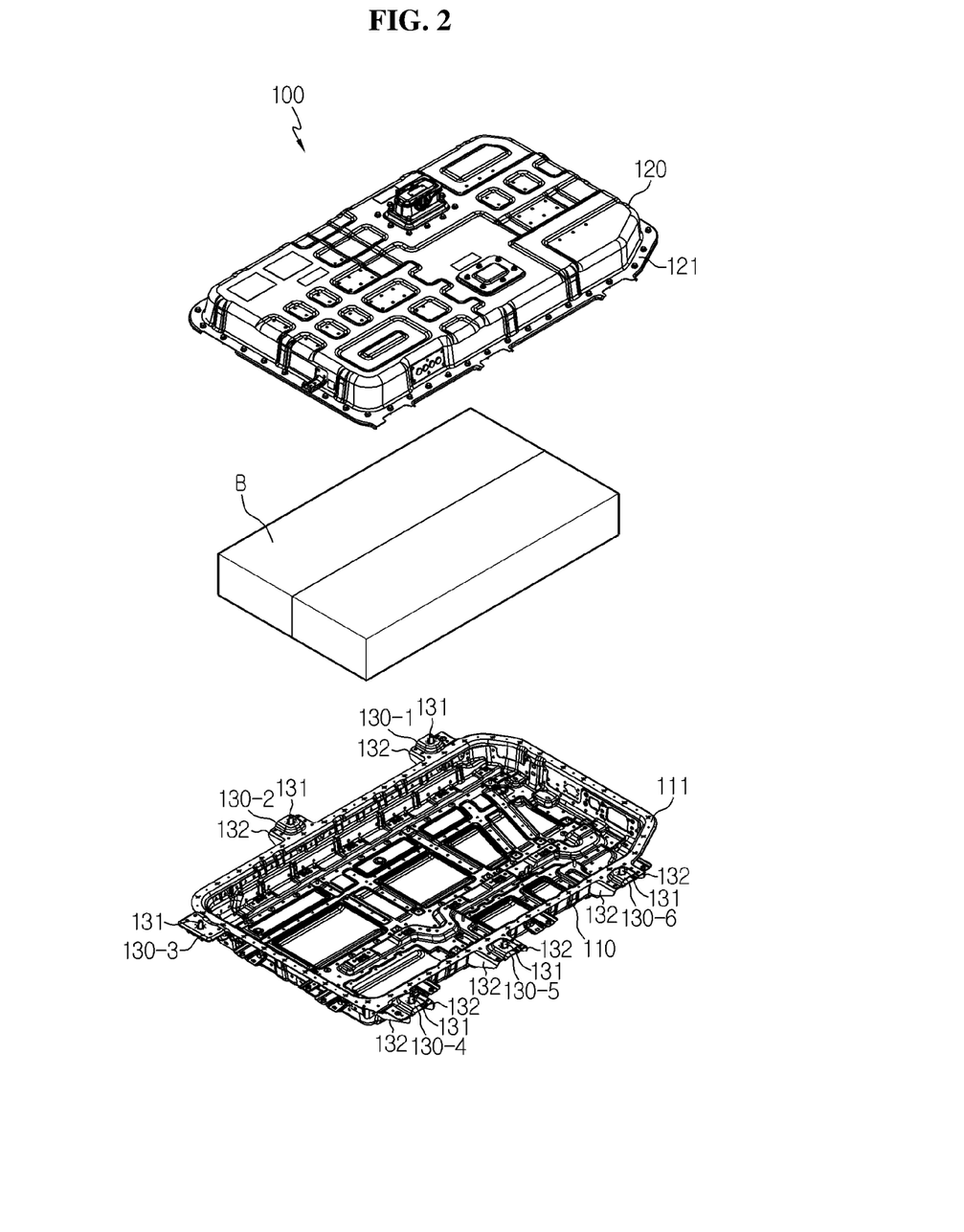
FIG. 2 is an exploded perspective view of the battery pack shown in FIG. 1.

FIG. 1 is an assembled perspective view of a battery pack 100 according to an embodiment of the present disclosure, and FIG. 2 is an exploded perspective view of the battery pack 100 shown in FIG. 1.

Referring to FIGS. 1 and 2, the battery pack 100 according to an embodiment of the present disclosure includes a battery module assembly B, a lower case 110 and an upper case 120.

The battery module assembly may include at least one battery module. The battery module assembly may be received in a space provided from the upper case 120 and the lower case 110. The battery module assembly may have an electrode terminal such as a positive electrode terminal and a negative electrode terminal. The electrode terminal provided in the battery module assembly may be electrically connected to electrode terminals provided in each battery module through a connecting element such as a bus bar and a wire.

Preferably, an electrical connection between two or more battery modules included in the battery module assembly may be established through a connection between electrode terminals provided in adjacent two battery modules.

For example, electrode terminals of the same polarity provided in two adjacent battery modules may be connected to establish a parallel connection between the two adjacent battery modules. That is, positive electrode terminals provided in the two battery modules may be connected to each other, and in the same way, negative electrode terminals may be connected to each other, to establish a parallel connection between the two battery modules.

As another example, a series connection between two battery modules may be established in a manner of connecting a positive electrode terminal provided in one of the two adjacent battery modules to a negative electrode terminal provided in the other battery module.

As another example, electrode terminals provided in two adjacent battery modules of a plurality of battery modules may be connected to each other with different polarities, and electrode terminals provided in two adjacent battery modules of the plurality of battery modules may be connected to each other with the same polarity, so that three or more battery modules may be connected both in series and in parallel.

The battery module assembly is received in the space provided by the upper case 120 and the lower case 110. Optionally, other elements such as a battery management system (BMS) or a cooler may be further received in the space provided by the upper case 120 and the lower case 110.

After the battery module assembly is seated in the receiving space provided by the lower case 110, a periphery part 111 of the lower case 110 and a periphery part 121 of the upper case 120 may be coupled together through a coupling element.

For example, a plurality of protrusions that protrudes upward with a predefined size and shape may be formed in the periphery part of the lower case 110, and a plurality of assembly grooves corresponding to the size, shape and location of each assembly protrusion formed in the lower case 110 may be formed in the periphery part of the upper case 120. Accordingly, the lower case 110 and the upper case 120 may be physically coupled together by inserting the plurality of assembly protrusions formed in the lower case 110 into the plurality of assembly grooves formed in the upper case 120.

Of course, for the coupling element used for physical coupling between the lower case 110 and the upper case 120, one of various components such as adhesives and bolts/nuts or methods such as welding may be used, or two or more of them may be used in combination.

At least one of the lower case 110 and the upper case 120 may have at least one coupler 130. Each coupler 130 refers to a part that protrudes outward horizontally from the periphery part of any one of the lower case 110 and the upper case 120.

Preferably, the plurality of couplers 130 is all formed in the lower case 110. For example, as shown in FIG. 2, a total of six couplers 130-1~130-6 may be formed in the periphery part of the lower case 110, spaced apart from each other. Specifically, first and second couplers 130-1, 130-2 may be formed in a first area of the periphery part of the lower case 110, a third coupler 130-3 may be formed in a second area of the periphery part of the lower case 110, and fourth to sixth couplers 130-4-130-6 may be formed in a third area of the periphery part of the lower case 110.

Each coupler 130 may have a first fastening hole 131 that penetrates up and down. A supporting rib 132 may be installed at two edges of each coupler 130. The supporting rib 132 is installed between each edge of each coupler 130 and the sides of the lower case 110, to prevent the deformation of each coupler 130 caused by external impacts.

Figure 3:
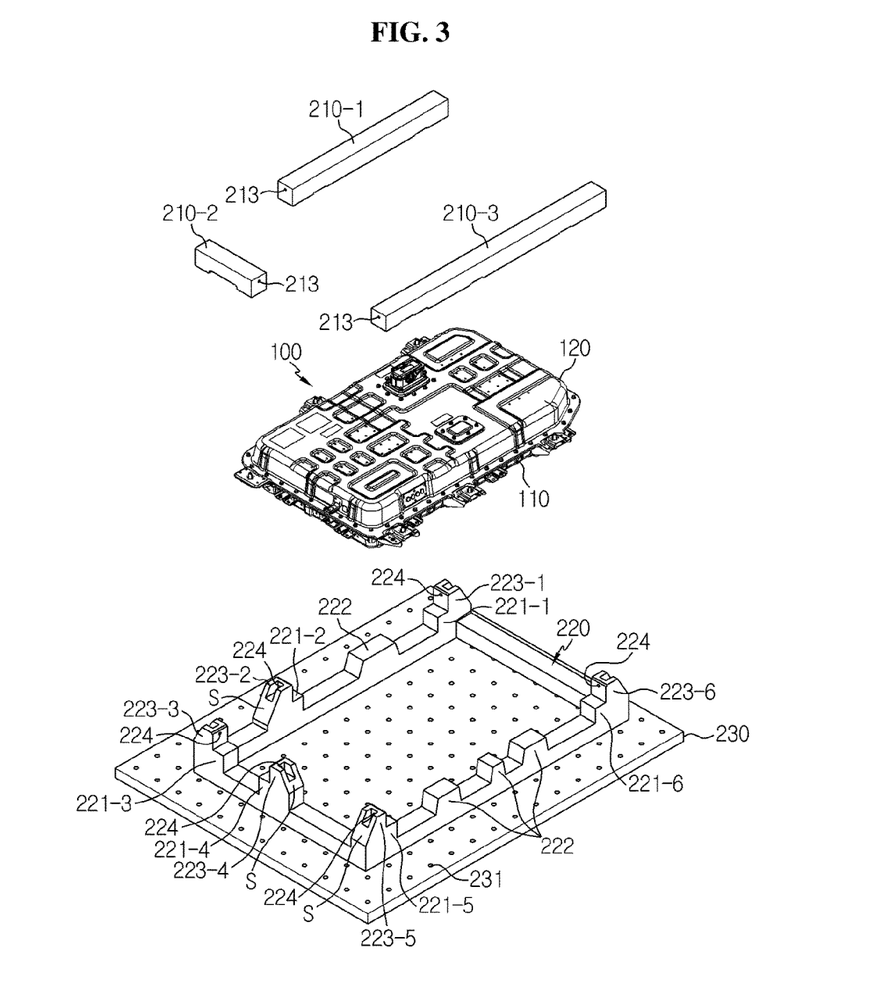
FIG. 3 is an exploded perspective view of a fixing jig included in a test apparatus according to an embodiment of the present disclosure.

FIG. 3 is an exploded perspective view of a fixing jig 200 included in a test apparatus 10 according to an embodiment of the present disclosure. The test apparatus 10 basically includes the fixing jig 200, and optionally, may further include a vibration generator ('300' in FIG. 8).

Referring to FIG. 3, the fixing jig 200 includes an upper block 210, a lower block 220 and a base plate 230.

One or two or more upper blocks 210 may be provided. When two or more upper blocks 210 are provided, one of the upper blocks 210 may be physically separated from the others. Hereinafter, assume that the fixing jig 200 includes three separated upper blocks 210-1~210-3 as shown in FIG. 3.

Each upper block 210 may be a bar type of a metal material that extends straight with a rectangular shape or a shape close to a rectangular shape in cross section of at least part thereof. When the cross section of each upper block 210 is rectangular, each side of the cross section may be a minimum of 700 mm long to withstand an axial force caused by vibration.

Each upper block 210 has a structure in which each upper block 210 can be coupled to at least one coupler 130 formed in the lower case 110 or the upper case 120 of the battery pack 100.

Figure 4:
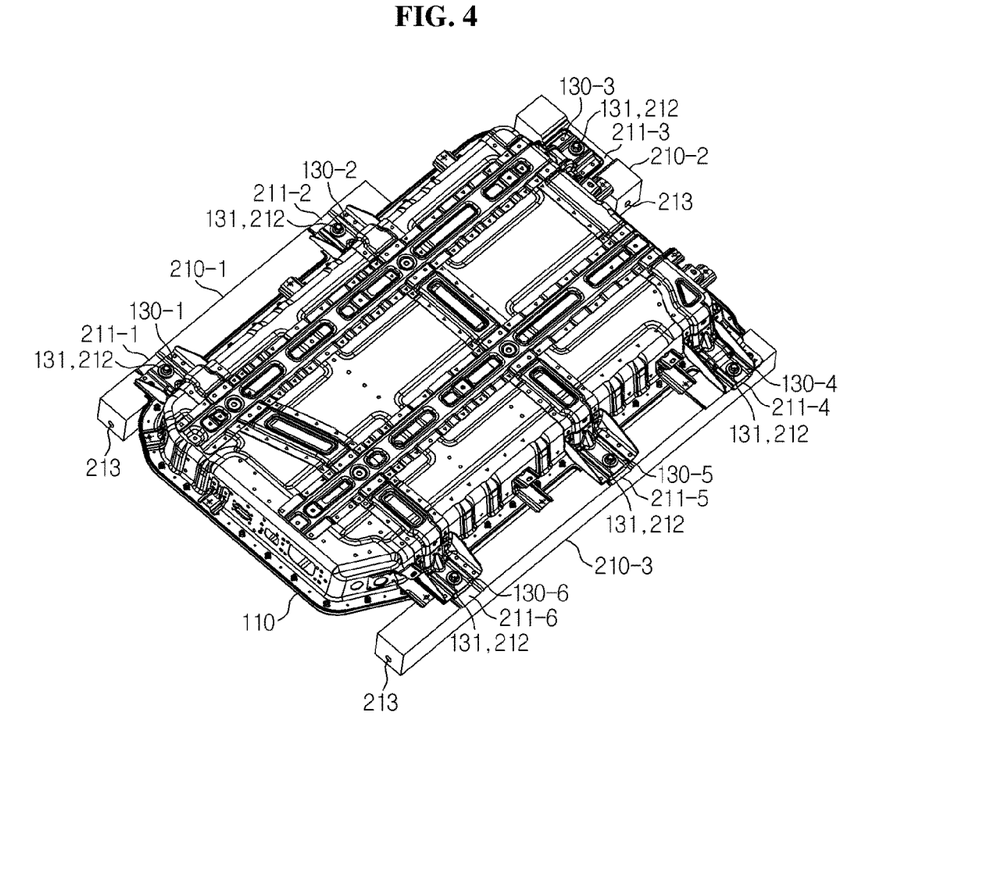
FIG. 4 is a diagram showing a coupling relationship between upper blocks and couplers provided in a battery pack shown in FIG. 3.

As shown in FIG. 3 and FIG. 4, the first upper block 210-1 may be placed such that the first upper block 210-1 can be coupled to the first and second couplers 130-1, 130-2, the second upper block 210-2 may be placed such that the second upper block 210-2 can be coupled to the third coupler 130-3, and the third upper block 210-3 may be placed such that the third upper block 210-3 can be coupled to the fourth to sixth couplers 130-4-130-6.

The lower block 220 is placed below the upper blocks 210-1~210-3 and on the base plate 230. Specifically, the lower surface of the lower block 220 may have a flat shape on the whole. Accordingly, the lower surface of the lower block 220 can be in surface contact with the upper surface of the base plate 230. The lower block 220 is fixed to the base plate 230 through a coupling element such as bolts in a state that its lower surface is in surface contact with the upper surface of the base plate 230.

Additionally, a plurality of main convex parts 221 is formed on the lower block 220. Each main convex part 221 refers to a part in which the first area, i.e., a portion of the upper part of the lower block 220 protrudes higher than the second area, i.e., a portion of the remaining area. The plurality of main convex parts 221 may provide a step structure to support the bottom of two ends of each upper block 210. That is, the lower surface of two ends of each lower block 220 may be seated on the upper surface of the plurality of main convex parts 221.

Meanwhile, the number of main convex parts 221 may be twice larger than the number of upper blocks 210. For example, as shown in FIG. 3, when three upper blocks 210-1, 210-2, 210-3 are included in the fixing jig 200, the lower block 220 may have six main convex parts 221-1-221-6. Accordingly, six main convex parts 221-1-221-6, each two in a pair, may support up two ends of each upper block 210.

Optionally, at least one subconvex part 222 is formed in the third area that does not overlap with the first area and the second area on the lower block 220. Each subconvex part 222 refers to a part that protrudes higher than the second area without any physical interference with the first area at which the plurality of main convex parts 221 is formed in the entire area of the upper part of the lower block 220.

For example, as shown in FIG. 3, one subconvex part 222 may be formed between the first main convex part 221-1 and the second main convex part 221-2, and three different subconvex parts 222 may be formed between the fifth main convex part 221-5 and the sixth main convex part 221-6.

In this instance, the number of subconvex parts 222 positioned between a pair of main convex parts 221 supporting two ends of each upper block 210 may be determined based on the distance between the two ends of each upper block 210 (i.e., length of each upper block 210) or the structure of the battery room provided in the electric vehicle in which the battery pack 100 will be mounted.

The thickness of at least part of the base plate 230 has a predefined board shape, and the base plate 230 is placed below the upper blocks 210-1~210-3, the lower block 220 and the battery pack 100 to support up all of them. The base plate 230 is positioned between the battery pack 100 and the vibration generator 300 to be described below to serve as a relay to transmit a vibration pattern that is transmitted from the vibration generator 300 for a vibration test of the battery pack to the battery pack 100 through the lower block 220 and the upper block 210.

FIG. 4 is a diagram showing a coupling relationship between the upper blocks 210-1~210-3 and the couplers 130-1~130-6 provided in the battery pack 100 as shown in FIG. 3. To help understanding, dissimilar to FIGS. 1 to 3, FIG. 4 is depicted to show the bottom surface of the lower case 110.

Referring to FIG. 4, a coupling relationship between the upper blocks 210-1~210-3 and the couplers 130-1~130-6 can be seen. Each upper block 210 has a guide groove 211 in an area corresponding to the location of each coupler 130 that is coupled to each upper block 210. Each guide groove 211 is for preventing the erroneous assembly between each upper block 210 and each coupler 130.

For example, a first guide groove 211-1 and a second guide groove 211-2 corresponding to a shape of the upper part of each of the first and second couplers 130-1, 130-2 are formed in the lower part of the first upper block 210-1, a third guide groove 211-3 corresponding to a shape of the upper part of the third coupler 130-3 is formed in the lower part of the second upper block 210-2, and fourth to sixth guide grooves 211-4-211-6 corresponding to a shape of the upper part of each of the fourth to sixth couplers 130-4-130-6 are formed in the lower part of the third upper block 210-3.

Additionally, the guide groove 211 of each upper block 210 may have a second fastening hole 212 at the location corresponding to the first fastening hole 131 of each coupler 130. Each upper block 210 may be fixed to each coupler 130 through a bolt inserted in vertical direction in a state that each upper block 210 is in contact with the upper part of each coupler 130 through each guide groove 211.

For example, the first upper block 210-1 may be individually fastened and fixed to the first and second couplers 130-1, 130-2 through the bolt inserted into the second fastening hole 212 of each of the first and second guide grooves 211-1, 211-2 from the first fastening holes 131 of each of the first and second couplers 130-1, 130-2 in a state that the upper block 210-1 is in contact with the upper part of each of the first and second couplers 130-1, 130-2 through the first and second guide grooves 211-1, 211-2. The second upper block 210-2 may be fastened and fixed to the second fastening hole 212 of the third guide groove 211-3 through the bolt inserted into the third coupler 130-3 from the first fastening hole 131 of the third coupler 130-3 in a state that the second upper block 210-2 is in contact with the upper part of the third coupler 130-3 through the third guide groove 211-3. The third upper block 210-3 may be individually fastened and fixed to the fourth to sixth couplers 130-4-130-6 through the bolt inserted into the second fastening hole 212 of each of the fourth to sixth guide grooves 211-4-211-6 from the first fastening hole 131 of each of the fourth to sixth couplers 130-4-130-6 in a state that the third upper block 210-3 is in contact with the upper part of each of the fourth to sixth couplers 130-4-130-6 through the fourth to sixth guide grooves 211-4-211-6. That is, the plurality of guide grooves 211-1-211-6 is coupled to the plurality of couplers 130-1~130-6 one-to-one.

Figure 5:
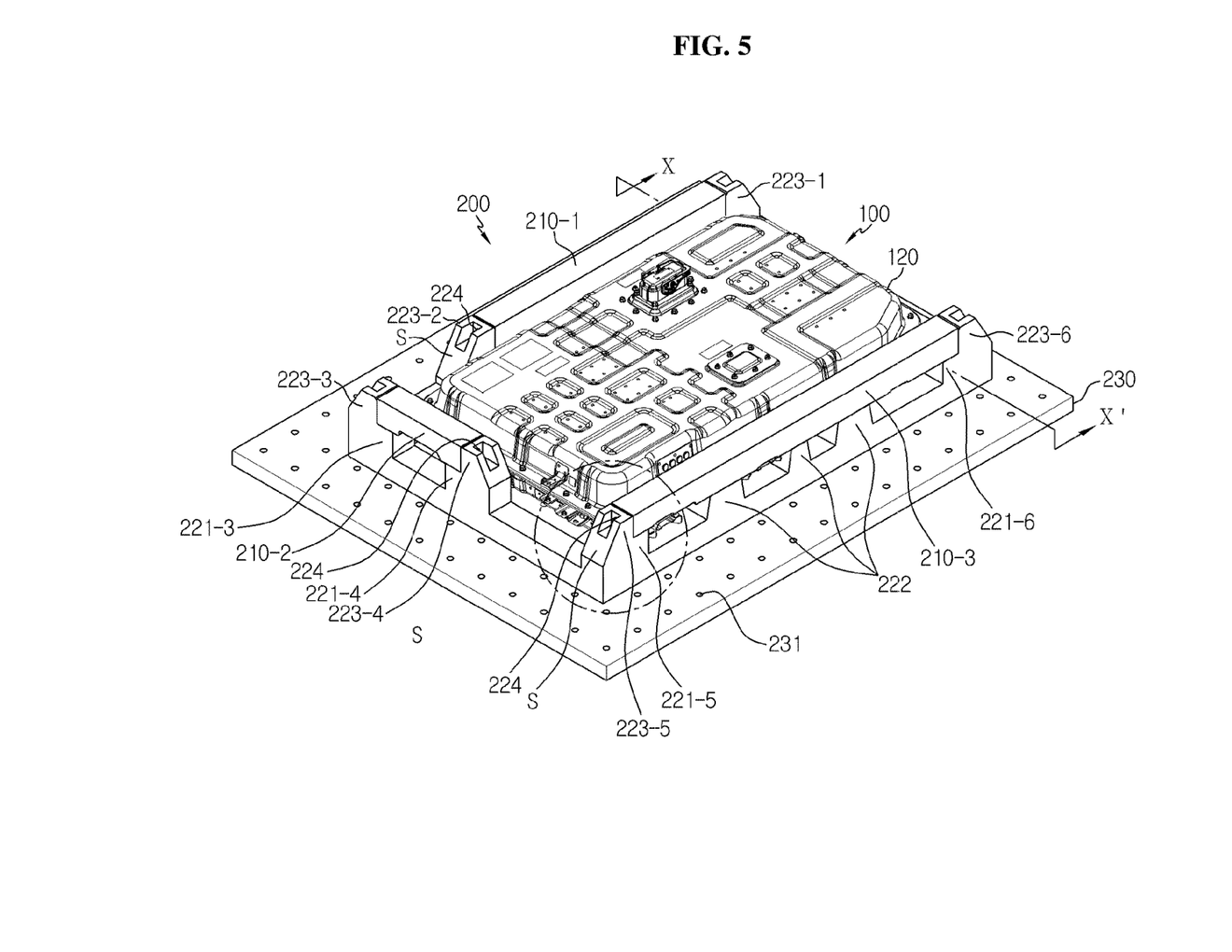
FIG. 5 is a diagram showing a coupling relationship between upper blocks and a lower block shown in FIG. 3.
Figure 6:
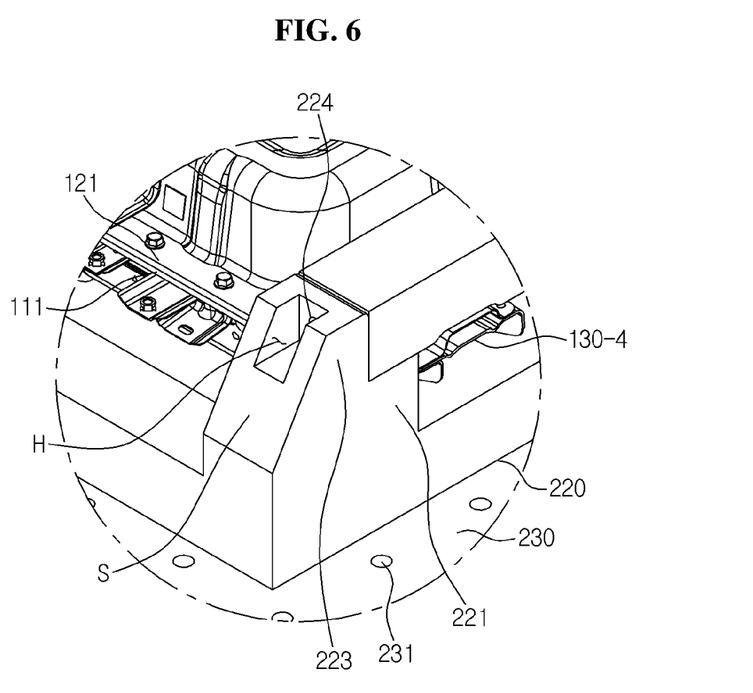
FIG. 6 is a partial enlarged view of section A in FIG. 5.
Figure 7:
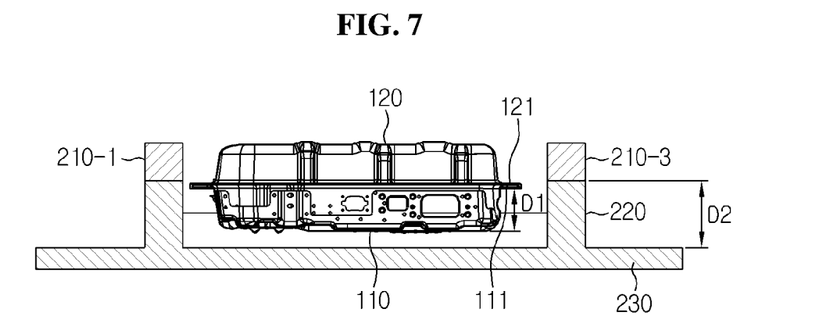
FIG. 7 is a cross-sectional view taken along the line X-X' of FIG. 5.

FIG. 5 is a diagram showing a coupling relationship between the upper blocks 210-1~210-3 and the lower block 220 shown in FIG. 3, FIG. 6 is a partial enlarged view of section A in FIG. 5, and FIG. 7 is a cross-sectional view taken along the line X-X' of FIG. 5.

Referring to FIG. 5, it can be seen that the upper blocks 210-1~210-3 fastened with the couplers 130-1-430-6 of the battery pack 100 are seated on the upper surface of the lower block 220. The upper blocks 210-1~210-3 may be seated on the upper surface of the lower block 220 through delivery means in a state that the upper blocks 210-1~210-3 are fastened with the couplers 130-1-430-6 of the battery pack 100.

Specifically, the bottom of each end of each upper block 210 is supported by one of the main convex parts 221-1-221-6. For example, the bottom of one end and the other end of the first upper block 210-1 may be individually supported by the first and second main convex parts 221-1, 221-2, the bottom of one end and the other end of the second upper block 210-2 may be individually supported by the third and fourth main convex parts 221-3, 221-4, and the bottom of one end and the other end of the third upper block 210-3 may be individually supported by the fifth and sixth main convex parts 221-5, 221-6.

Additionally, two ends of each of the first to third upper blocks 210-1~210-3 are simultaneously supported by the first to sixth main convex parts 221-1-221-6, and at the same time, the central part of the first upper block 210-1 (i.e., the remaining part except the two ends) is supported up by one subconvex part 222 positioned between the first and second main convex parts 221-1-221-2, and the central part of the third upper block 210-3 is supported up by three different subconvex parts 222 positioned between the fifth and sixth main convex parts 221-5, 221-6.

At least one subconvex part 222 formed independently from the first to six main convex parts 221-1-221-6 additionally supports up at least one of the upper blocks 210-1-210-3, thereby improving the overall structural stability of the fixing jig 200.

Meanwhile, referring to FIG. 6, the same number of stoppers 223 as the number of main convex parts 221 may be formed in the lower block 220. Each stopper 223 refers to a part that penetrates up from a partial area of the upper part of each main convex part 221. Accordingly, first to sixth stoppers 223-1-223-6 are positioned on each of the first to sixth main convex parts 221-1-221-6.

Specifically, the first stopper 223-1 comes into surface contact with one side surface of one end of the first upper block 210-1, and the second stopper 223-2 comes into surface contact with one side surface of the other end of the first upper block 210-1. The third stopper 223-3 comes into surface contact with one side surface of one end of the second upper block 210-2, and the fourth stopper 223-4 comes into surface contact with one side surface of the other end of the second upper block 210-2. The fifth stopper 223-5 comes into surface contact with one side surface of one end of the third upper block 210-3, and the sixth stopper 223-6 comes into surface contact with one side surface of the other end of the third upper block 210-3. Accordingly, two different surfaces of each end of each upper block 210 are supported on one main convex part 221 and one stopper 223 through surface contact. The horizontal direction movement of each upper block 210 may be limited by a pair of stoppers 223.

Moreover, each stopper 223 may have a slope surface S on the opposite side to the side on which it comes into surface contact with one side surface of one end of the particular upper block 210. Additionally, each stopper 223 may additionally have a groove H where a portion of the slope surface S is recessed in a predefined depth and shape from the slope surface S to the upper block 210. When the groove H is formed, each stopper 223 has a structure of '⊏' shape when viewed from the top. In the structure of '⊏' shape of each stopper 223, two facing parts act as a rib to reinforce the strength of the middle part.

Additionally, each stopper 223 may be fixed to each upper block through the bolt inserted in horizontal direction in a state that each stopper 223 is in surface contact with the side surface of one end of each upper block 210. Specifically, each stopper 223 may have a fourth fastening hole 224 at the location corresponding to the third fastening hole 213 provided at each end of the particular upper block 210. Accordingly, when the upper blocks 210-1~210-3 is seated on the lower block 220, the upper blocks 210-1~210-3 may be fixed to the lower block 220 through the bolt inserted into the third fastening hole 213 formed on the side surface of each end of the upper blocks 210-1~210-3 from the fourth fastening hole 224 of each stopper 223.

Referring to FIG. 7, the fixing jig 200 provides the battery pack 100 with a hanging structure. Going into detail, the battery pack 100 is directly coupled to the lower surface of the upper blocks 210-1~210-3 through the couplers 130-1~130-6 provided in the lower case 110.

Additionally, the vertical distance D1 from each coupler 130 to the lowest end of the lower case 110 is shorter than the height of each main convex part 221, i.e., the vertical distance D2 from the upper surface of the main convex part 221 to the upper surface of the base plate 230. Accordingly, the battery pack 100 is spaced apart at a predefined distance upward from the base plate 230.

Figure 8:
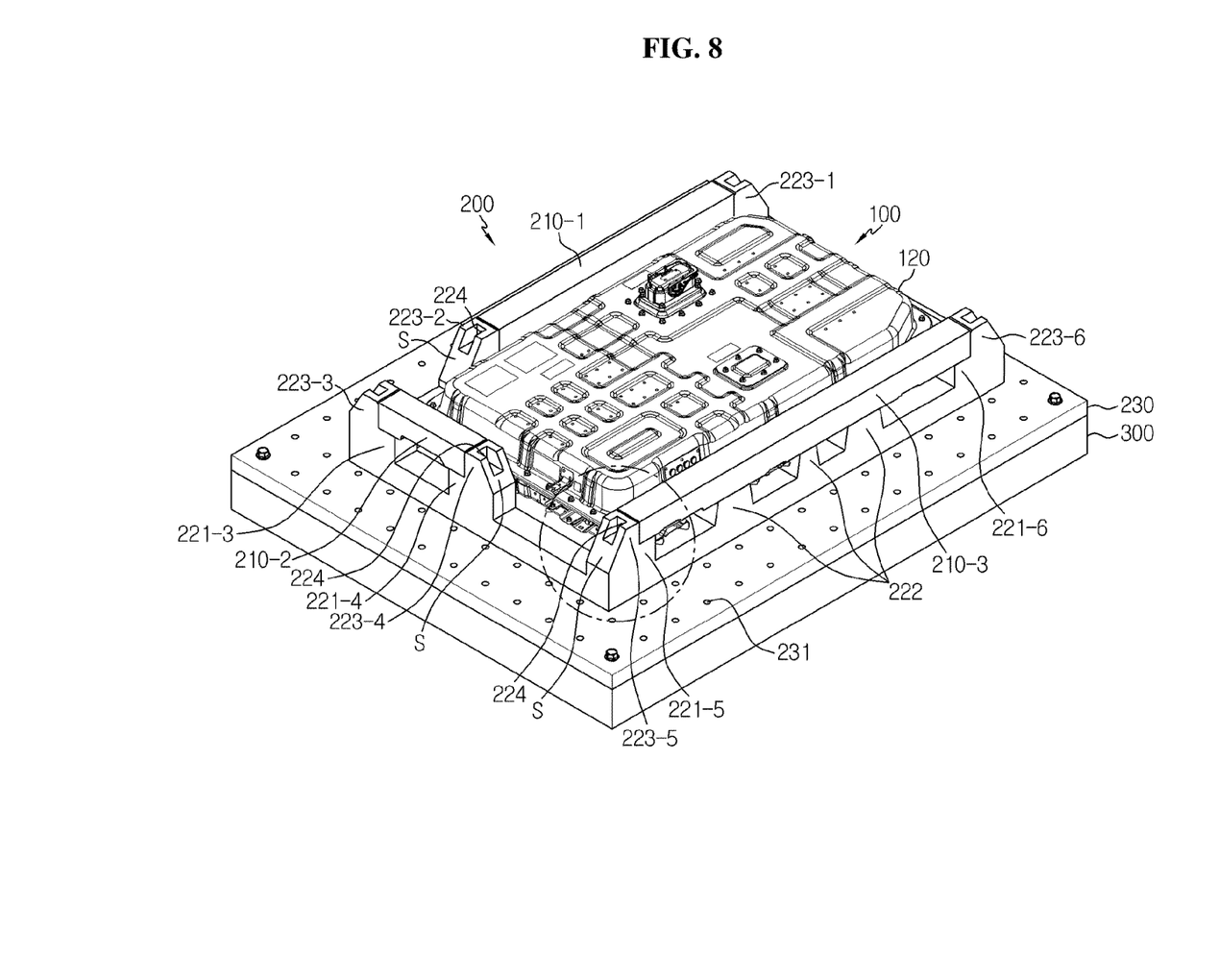
FIG. 8 is a diagram showing a coupling relationship between a fixing jig and a vibration generator of a test apparatus according to an embodiment of the present disclosure.

FIG. 8 is a diagram showing a coupling relationship between the fixing jig 200 and the vibration generator 300 of the test apparatus 10 according to an embodiment of the present disclosure.

Referring to FIG. 8, the base plate 230 may have at least one fifth fastening hole 231. The fifth fastening hole 231 refers to each part through which the base plate 230 penetrates up and down.

Preferably, a plurality of fifth fastening holes 231 may be formed, and the plurality of fifth fastening holes 231 may form a row and two columns. For example, as shown in FIG. 8, the base plate 230 may have a total of 180 fifth fastening holes 231 arranged in 12 rows and 15 columns.

The vibration generator 300 may include at least one vibrator and a protection case. The vibrator is configured to generate vibration using electrical energy. The protection case receives at least one vibrator in its internal space. The vibration generator 300 may be coupled and fixed to part of the base plate 230. Preferably, the base plate 230 may be fixed to the vibration generator 300 through bolts inserted in vertical direction in a state that the base plate 230 is at least partially in surface contact with the upper surface of the vibration generator 300.

For example, at least two of the plurality of fifth fastening holes 231 may be fixed to sixth fastening holes (not shown) formed on the upper surface of the vibration generator 300 placed below the base plate 230 through the bolts.

The vibration generator 300 generates vibration with a preset pattern in a state that the vibration generator 300 is fixed to the base plate 230 through its upper surface. Specifically, the vibration generator 300 vibrates in a regular or irregular pattern along at least one of width-wise direction, length-wise direction and height-wise direction of the battery pack 100. In this instance, the pattern of vibration generated by the vibration generator 300 may be based on data pre-collected using a vibration sensor mounted in the battery room while the electric vehicle is traveling.

As described above, the battery pack 100 is fixed to the fixing jig 200 spaced apart upward from the base plate 230 by the upper blocks 210-1~210-3 and the lower block 220, and accordingly, the vibration pattern from the vibration generator 300 is transmitted to the battery pack 100 through the lower block 220, the upper blocks 210-1~210-3 and the couplers 130-1~130-6 in a sequential order, instead of being directly transmitted to the battery pack 100.

Although the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

Additionally, many substitutions, modifications and changes may be made to the present disclosure described hereinabove by those skilled in the art without departing from the technical aspects of the present disclosure, and the present disclosure is not limited to the above-described embodiments and the accompanying drawings, and each embodiment may be selectively combined in part or in whole to allow various modifications.

What is claimed is:

1. A test apparatus comprising a fixing jig for vibration testing of a battery pack, wherein the fixing jig comprises:
    at least one upper block that is coupled to at least one coupler of the battery pack;
    a lower block below the at least one upper block; and
    a base plate having a board shape and below the lower block,
    wherein a lower surface of the lower block has an entire flat shape to allow surface contact with an upper surface of the base plate,
    wherein a plurality of main protrusions that protrudes higher than a second area of an upper part of the lower block is in a first area of an upper part of the lower block, and
    wherein the plurality of main protrusions provides a step structure to support bottom of two ends of each upper block.

2. The test apparatus according to claim 1, wherein each upper block has at least one guide groove corresponding to a shape of an upper part of each coupler.

3. The test apparatus according to claim 2, wherein each upper block is fixed to each coupler by a bolt inserted in vertical direction in a state that each upper block is in contact with the upper part of each coupler through each guide groove.

4. The test apparatus according to claim 1, wherein the lower block has a plurality of stoppers to support one side surface of each end of each upper block through surface contact.

5. The test apparatus according to claim 4, wherein each stopper is fixed to each upper block by a bolt inserted in horizontal direction in a state that each stopper is in surface contact with the side surface of one end of each upper block.

6. The test apparatus according to claim 1, wherein at least one secondary protrusion that protrudes higher than the second area is in a third area of an upper part of the lower block, and
    a central part between the two ends of the at least one upper block is supported by each secondary protrusion.

7. The test apparatus according to claim 1, further comprising:
    a vibration generator coupled to part of the base plate to generate vibration in a preset pattern.

8. The test apparatus according to claim 7, wherein the base plate is fixed to the vibration generator by a bolt inserted in vertical direction in a state that the base plate is in surface contact with an upper surface of the vibration generator.

* * * * *